UNITED STATES PATENT OFFICE.

JOSEPH A. JEFFERY, OF DETROIT, MICHIGAN, ASSIGNOR TO JEFFERY-DEWITT COMPANY, OF DETROIT, MICHIGAN, A CORPORATION OF MAINE.

CERAMIC INSULATING MATERIAL.

1,409,953.   Specification of Letters Patent.   Patented Mar. 21, 1922.

No Drawing.   Application filed May 15, 1920. Serial No. 381,637.

*To all whom it may concern:*

Be it known that I, JOSEPH A. JEFFERY, a citizen of the United States, and a resident of Detroit, in the county of Wayne and State of Michigan, have made an Invention Appertaining to Ceramic Insulating Materials; and I do hereby declare the following to be a full, clear, and exact description of the invention, such as will enable others skilled in the art to which it appertains to make and use the same.

My invention relates to the production of a ceramic material and the raw batch thereof. The invention particularly has for its object to provide an insulating material of the porcelain type, which has high electrical resistance at atmospheric and higher temperatures and at the same time possesses the following additional valuable properties:— An exceptionally high mechanical strength, a vitreous structure throughout the mass, a low coefficient of thermal expansion, a high specific gravity, a high modulus of elasticity, a high thermal conductivity, a low specific heat and maximum physical and chemical homogeneity.

By reason of these properties the articles composed of the material embodying my invention are exceedingly valuable when used as insulators under conditions where a considerable resistance to impact, compression, tension, vibration, and other mechanical strains, imperviousness to liquids and gases, and resistance to sudden temperature changes, are required.

The material of my invention is particularly valuable where the articles composed thereof are subjected to electrical stresses at high temperatures and to sudden and wide changes of temperature, since the material has a high dielectric strength over a wide range of temperature, a low thermal expansion; and hence may be subjected to the said conditions without serious electrical leakage or mechanical breakage of the insulator. My invention thus is of value when applied to insulators for spark plugs used in internal combustion engines, which require a high hot dielectric strength, a high mechanical strength, a high thermal diffusivity, and a low coefficient of thermal expansion to efficiently perform their functions.

Insulators of the porcelain type in general use do not possess the property of high dielectric strength at high temperatures because of the use of comparatively large amounts of feldspar, or other alkali metal compounds, as fluxes in the raw batch, which introduces a corresponding amount of one or more alkalies into the mixture. Consequently, the electrical resistance of such insulators decreases rapidly as the temperature increases. They do not possess the property of exceptionally high mechanical strength or of maximum physical stability because of a relatively low specific gravity, a low modulus of elasticity and indefinite chemical and physical homogeneity. They do not possess the property of exceptionally high thermal diffusivity because of this low specific gravity and indefinite chemical and physical homogeneity and do not possess a minimum coefficient of thermal expansion because of the chemical composition in respect to the uncombined materials resulting in the poor chemical and physical homogeneity mentioned above.

These defects in the porcelain type of insulator, well known in the art, I have overcome as follows: First, by using, in compounding the raw batch of the body, the alkaline earth oxides as the principal fluxes. These may be introduced in the form of mineralogical or raw compounds as talc or through definite, hard calcined, vitrified or fused minerals or through definite, hard calcined, vitrified or fused synthetic compounds as sources. Second, by using, in compounding the raw batch of the body, one or more chemically and mineralogically definite, dense and stable raw constituents such as the mineral sillimanite or chemically and mineralogically definite, hard, calcined, vitrified or fused natural, or synthetic constituents of such compounds prepared by prefiring, in such proportions that with the minimum amount of raw clays, consisting of kaolin alone or a mixture of kaolin and ball clays in proportions necessary for plasticity and practical working properties, or a calcined mixture of clay, alumina and an alkaline earth metal flux compound with raw clay, that on firing the body to the required temperature to vitrify the mass, definite end products are formed and a maximum amount of sillimanite is produced, causing the resulting material to be practically in chemical and physical equilibria and of maximum density, both apparent and true.

Raw materials, other than clays, which increase in density upon firing or by pyrochemical reaction with the other constituents, may be used. The amount of hard calcined, vitrified or fused natural or synthetic material, or of dense, stable, hard natural minerals of the same physical characteristics, used, is governed by the use for which the product is intended and the properties, or their degrees, which it is desired to secure in the final product.

The quality of the final product may be controlled in the following way: 1. Increase of the hot dielectric strength and the toughness of the body are brought about by increasing the alkaline earth metal content and decreasing the alkali metal content in the final body composition; 2. Resistance to sudden temperature changes resulting from a low coefficient or thermal expansion of the body is brought about by a high content of sillimanite or other inert material in the final body composition; 3. The density of the body is controlled by the quality of the sillimanite and its amount with respect to the glassy matrix. All the above qualities are controlled not only by the chemical composition of the final product but also by the pyrochemical treatment of the materials.

The alkaline earth metal oxides are used as the principal fluxes in forming the raw batch of the calcined portion, which upon firing is to contain the principal fluxes of the body batch. It is to be understood that this calcined portion may consist of flux alone or of sillimanite and flux. These oxides may be introduced through the use of a number of different raw materials, such as magnesite or other magnesium carbonates, magnesium oxide, the hydrate of magnesia, either the artificial hydrate or mineral hydrate, brucite, talc, and other magnesium compounds yielding the oxide or a silicate on heating; whiting, or other calcium carbonates, calcium oxide, calcium hydrate, and other calcium compounds yielding the oxide or a silicate on heating; dolomite or other mixed calcium and magnesium carbonate, dolomitic oxide, dolomitic hydrate and other mixed calcium and magnesium compounds yielding the oxides or silicates on heating; or beryllium, barium, strontium, lithium and other alkaline earth metal compounds yielding the oxide or a silicate on heating.

While both alkali metal and alkaline earth metal oxides may be used as fluxes, the former, producing alkali metal silicates in the resulting material upon firing, seriously reduce the dielectric strength of the final product at high temperatures. The maximum amount of the oxides of the alkaline earth metals, or their equivalents, and the minimum amount of the oxides of the alkali metals, or their equivalents, possible, are used, in order to secure the requisite properties desired to be produced in the material resulting after firing, particularly as to the hot dielectric strength and resistance to sudden temperature changes. The exact proportion of one to the other will be governed by the use for which the final product is intended and the properties, or their degrees, which it is desired to secure in the article to be produced, and this proportion is particularly governed by the firing conditions commercially feasible in the ceramic art. The total amount of fluxing oxides used is determined by the chemical composition and the amount of the calcine selected to constitute the flux of the body batch. They will vary from about 4% to about 10% of the body batch.

In compounding, previous to pre-firing, the material which is either to constitute or to contain the sillimanite of the body batch, the raw materials used are calculated in definite proportions to produce, on firing to the proper temperature, either synthetic sillimanite alone or a selected definite silicate which will contain a definite amount of synthetic sillimanite together with the flux so that there will be preferably incorporated in the raw batch about 40% to about 50% of sillimanite. For example, if a calcine is to be employed which consists wholly of sillimanite the calculated raw batch for this calcine will be 258 parts of kaolin and 102 parts of anhydrous aluminum oxide, or 258 parts of kaolin and 156 parts of hydrated aluminum oxide. Instead of synthetic sillimanite, the natural minerals sillimanite, andalusite and cyanite or kyanite may be used.

In compounding the raw body batch preparatory to forming and firing the articles in their final shapes, the nonplastic material is preferably ground and mixed with other materials, mostly clays. The nonplastic material is formed of one or more chemically, mineralogically, definite, dense and stable raw constituents like sillimanite, andalusite and cyanite and of chemically and mineralogically definite, hard, calcined, vitrified or fused natural or synthetic constituents like sintered or fused magnesium oxide; or it is formed of a mixture of raw kaolin, bauxite, diaspore or similar material and alumina sufficient in amount to produce the required amount of synthetic sillimanite in the final body, and natural or synthetic silicates of the form $XMgO.YAl_2O_3.ZSiO_2$; or it is formed of synthetic sillimanite $(Al_2O_3.SiO_2)$ and synthetic silicates of the form $XMgO.YAl_2O_3.ZSiO_2$; or it is formed of a mixed synthetic silicate of the last two named.

The balance of the mixture consists chiefly of clays. It may be formed of kaolin alone or a mixture of kaolin and ball clays, the latter being added for plasticity and general working properties of the raw body. It is, however, preferable to use a clay or a clay mixture that will mature at about the temperature at which the body containing the nonplastics and the plastics will mature in the firing. I find it preferable to use a mixture of Edgars' plastic clay in as large amount as the manufacturing conditions will permit, one or more ball clays such as Johnson & Porter ball clays to increase the plasticity and the proper working quality, and a suitable amount of china clay, such as Harris clay, to make up the balance of the raw clay content. I have selected Edgars' plastic kaolin as the type of kaolin that I preferably use. A description of Edgars' plastic kaolin is given in the United States Geological Survey Paper No. 11, pages 83–85, 1903. Likewise the Johnson & Porter ball clay is the type of the ball clay that I preferably use and is described in the Tennessee Geological Survey Bulletin No. 5, pages 85–87, 1910. Also the Harris clay is a type of china clay that I find preferable and it is described in the United States Bureau of Mines, Bulletin No. 53, pages 150–151, 1913. A small amount of flux, such as feldspar, is preferably added to the clay mixture to control the texture of the final body.

The materials that form the raw batch are mixed in calculated and in such predetermined proportions that on firing to the required temperature to thoroughly vitrify the mass and allowing proper time for the pyrochemical reactions to reach completion, definite end products are formed, causing the resulting material to be practically in chemical and physical equilibria and of maximum density, both apparent and true.

If the requisite conditions in the final product after firing, as hereinafter set forth, are secured, it is immaterial whether one or more than one calcine or natural mineral, or a mixture of calcines and natural minerals as discussed above, are used to make up the non-plastic portion of the body batch.

Examples of possible compositions based on the principles just discussed, and designed to produce the hereinafter stated requisite conditions in the final product, are given in the following tables:

Table No. 1.

| Raw batch for combined synthetic sillimanite and flux. Cone 18. | Raw batch for the body. Cone 17. | Calculated end products in fired body. | Collected totals. | Collected totals 100% basis. |
|---|---|---|---|---|
| E. p. kaolin........ 71.2<br>$Al_2O_3.3H_2O$ ........ 21.0<br>Talc........ 7.8 | Calcined $XAl_2O_3.SiO_2YMgO$. 58.24<br>$Al_2O_3.4SiO_2$.<br>Feldspar........ 2.91<br>Johnson & Porter ball clay (raw) 9.72<br>Harris clay (raw)........ 9.72<br>E. p. kaolin (raw)........ 19.41 | Sillimanite........ 38.80<br>Glass matrix........ 22.35<br>Sillimanite........ 24.36<br>$SiO_2$........ 9.03<br>$H_2O$ driven out........ 5.46 | 63.16<br>31.38 | 66.8<br>33.2 |
| 100.0 | 100.0 | 100.0 | 94.54 | 100.0 |

Table No. 2.

| Raw batch of the body. | Calculated end products in fired body. Cone 16. | Collected totals. | Collected totals 100% basis. |
|---|---|---|---|
| Natural mineral sillimanite $Al_2O_3.SiO_2$ ........ 44.0<br><br>Talc........ 5.2<br>Feldspar........ 2.5<br>Raw ball clay........ 9.0<br>Raw Harris clay........ 9.0<br>Raw Edgars' plastic kaolin........ 30.3 | Sillimanite........ 44.0<br>Glassy matrix........ 7.50<br>Volatile........ .20<br>Sillimanite........ 30.35<br>$H_2O$ (driven out)........ 6.70<br>Silica........ 11.25 | 74.35<br>18.75 | 79.90<br>20.10 |
| 100.0 | 100.0 | 93.10 | 100.0 |

These compositions when suitably prepared in the raw batch by the usual processes of milling, blunging and filter-pressing, are plastic and may be worked and formed into the desired insulator shapes in preparation for the kiln by any of the processes known to the art. The milling operation, however, should be sufficient to give the proper homogeneity for the purpose for which the body is intended.

Bodies made from this material may be glazed or unglazed depending upon the use to which the objects are to be put. The "fitting" of the glaze may require certain changes, well known in the ceramic art, in the body composition and it is understood that these changes may be made without departing from the spirit of my invention. It is, however, preferable that the glaze be so composed as to fit the body composition rather than that the body composition be materially altered. The glaze may be applied to the raw or to the bisque body according to the methods of manufacture and the results desired.

Upon the application of the glaze to the bodies and firing in a kiln to a suitable temperature and allowing the proper time for the pyrochemical reactions to reach completion, they become exceptionally dense and strong mechanically, vitreous throughout the mass, impervious to liquids and gases and develop a proper glaze. These bodies in the dry green state are, by virtue of the nature and amount of the non-plastic constituents used, dense, but lightly bonded and friable bodies, which are exceptionally rapid cutting by any means of dry-forming known to the art.

The proportions of the constituents, both raw and calcined, or of their equivalents, used in compounding the raw body batch may be varied according to the method of manufacture and according to the properties, or their degrees, which are required in the resultant material of the insulator.

As indicated in the tables, it is desirable to introduce a small amount of feldspar in order that the crystallization of the sillimanite in the resultant material during firing and cooling may be controlled and thus improved. The feldspar may be introduced as indicated in the tables or through one of the synthetic silicates. On account of its detrimental effect on the resistivity at high temperatures as well as on other important properties of the body, it is used in the smallest amount possible.

The final bodies produced by proper manipulation and firing of the materials of the tables contain a large amount of sillimanite, a small amount of glassy matrix and a small amount of silica. The sillimanite will vary from 60% to 85% according to the batch mixture and the firing conditions. Moreover, the silica that is derived from the clay upon the formation out of the clay when the batches are fired are also small in amount and enters into solution or combination in the glassy matrix, as for instance, in table No. 2 the silica from the raw clay is only 11.25% which in the final body is 12.2%. This may increase however if the firing is imperfect which would result in the production of less sillimanite in the final body. The firing and manipulation is such that the silica thus derived does not exceed 17%.

The batches formed by the compositions set forth in the tables given above, are particularly adapted to the ordinary process of plastic forming. When, however, the raw bodies are formed by casting processes, the raw batch is necessarily varied so as to permit the requisite flow of water into the mold from the slip by the use of a short clay, such as Harris clay. In order, however, to maintain the control of the maturing of the body in the firing and yet permit the proper removal of the water during the casting, dehydrated Edgars' plastic clay is used. To maintain this control of the maturing of the body the largest amount of the calcined or dehydrated Edgars' plastic clay is used that is consistent with the working conditions existing in the casting process. The balance of the clay content is made up of the short clay or nonplastic clay which cooperates with the calcined clay to permit the proper and continuous removal of the water from the body while in the mold. To control the grain and texture of the final body, a slightly greater amount of feldspar is ordinarily required when the body is formed by the casting process. A composition particularly adapted for the casting process is illustrated in the following example:

Table No. 3.

| Raw batch for combined synthetic sillimanite and flux. Cone 18. | Raw batch for the body. Cone 17. | Calculated end products in body. | Collected totals. | Total 100% basis. |
|---|---|---|---|---|
| Kaolin................ 71.2 | Calcined $XAl_2O_3.SiO_2.YMgO$. 60.00 $Al_2O_3.4SiO_2$. | Sillimanite.............. 40.00 | 63.54 | 66.2 |
| $Al_2O_3.3H_2O$.......... 21.0 | | Glassy matrix.......... 23.75 | 32.46 | 33.8 |
| Talc................. 7.8 | Feldspar................. 3.75 | | | |
| | J. P. ball clay........... 10.00 | Sillimanite.............. 23.54 | | |
| | Harris clay............. 18.75 | $SiO_2$.................. 8.71 | | |
| | E. P. kaolin (calcined).... 7.50 | $H_2O$ (driven out)........ 4.00 | | |
| 100.00 | 100.00 | 100.00 | 96.00 | 100.00 |

The nonplastic constituents, either natural or synthetic, of the raw body batch, are used as a means of controlling the drying and the firing shrinkages and the casting qualities. They incidentally provide a means of securing high cutting speed in dry-forming as mentioned above. These nonplastic constituents, being themselves physically dense and homogeneous, of high specific gravity and of definite chemical composition, produce, upon mixing with suitable proportions of raw plastic constituents of definite chemical composition and firing to a suitable temperature under proper conditions, a physically dense and homogeneous final product, vitreous throughout the mass, of high specific gravity, of exceptionally high mechanical strength, of a high modulus of elasticity, of a high thermal conductivity, of a high hot dielectric strength, of a low specific heat, and one which is practically in chemical and physical equilibria.

By controlling the chemical and mineralogical composition of the raw body batch there is produced in the final product, after firing, the following requisite conditions:—

1. A maximum amount of sillimanite and a minimum amount of glassy matrix. 2. Alkaline earth metal silicates in excess of alkali metal silicates in the glassy matrix. 3. A minimum amount of silica, substantially all of which is in combination or in solution. 4. No elements or compounds in unstable form, or ones which will become unstable within the temperature range of the commercial use of the product. 5. A maximum chemical and physical equilibria. 6. A maximum density, both apparent and true.

This chemical control, therefore, results in a chemical composition which, coupled with the above stated physical properties, gives a final product having also, in the highest degree, the properties of high dielectric strength, or resistivity, at high temperatures under operating conditions as in a high speed, high compression internal combustion engine, and a minimum coefficient of thermal expansion.

In order to obviate prolixity in the claims, I have specified in some parts of the specification and in some of the claims a single compound of a particular class, but it is to be understood that the claim covers and comprehends in each case one or more compounds of that class and that I may use a plurality of compounds of the class named and yet be operating within the scope of the claim in question. Also where I refer to the amount of the flux in the claims, I have reference to the amount of the flux compounds such as talc and feldspar as introduced originally even though the compounds are modified by prefiring and not to basic oxides of the fluxing metals nor to the modifications produced by the prefiring. It is to be understood, however, that I contemplate covering in such claims equivalent fluxing constitutents whether claimed in the raw batch compositions or in the final product compositions.

I claim:

1. The raw batch of a ceramic material comprising a mixture of sillimanite, a flux and a clay mixture the clay content, when heated by itself, maturing at the temperature at which the ceramic body matures.

2. The raw batch of a ceramic material comprising approximately equal parts of clay and sillimanite and 4% to 10% alkaline earth metal and alkali metal fluxes.

3. The raw batch of a ceramic material comprising a mixture of approximately equal amounts of clay and sillimanite and from 4% to 10% of flux formed of alkaline earth metal compound and alkali metal compound, the alkaline earth metal compound being in excess of the alkali metal compound.

4. The raw batch of a ceramic material comprising a combined synthetic sillimanite and flux and a clay mixture the clay content, when heated by itself, maturing at the temperature at which the ceramic body matures.

5. The raw batch of a ceramic material comprising clay and a combined synthetic sillimanite and flux, the clay content, when heated by itself, maturing at the temperature at which the ceramic body matures.

6. The raw batch of a ceramic material comprising a mixture of sillimanite and a clay mixture, the clay content, when heated by itself, maturing at the temperature at which the ceramic body matures and 4 to 10% of flux.

7. The raw batch of a ceramic material comprising clay and a combined synthetic sillimanite and alkaline earth metal compound, the clay content, when heated by itself, maturing at the temperature at which the ceramic body matures.

8. The raw batch of a ceramic material comprising clay, a combined synthetic sillimanite and alkaline earth metal compound, the clay content, when heated by itself, maturing at the temperature at which the ceramic body matures, and an alkali metal compound.

9. The raw batch of a ceramic material comprising a combined synthetic sillimanite and about 4.5% of an alkaline earth metal compound, a clay mixture and about 3% of alkali metal compound.

10. The raw batch of a ceramic material comprising a combined synthetic silicate consisting of sillimanite and flux and a clay mixture containing Edgars' plastic kaolin, ball clay and china clay.

11. The raw batch of a ceramic material comprising a combined synthetic sillimanite and flux and a clay mixture containing Edgars' plastic kaolin of about 20% of the batch and the remainder formed of ball clay and china clay.

12. The raw batch of a ceramic material comprising a clay mixture and a combined synthetic sillimanite and flux formed of about 70% of Edgars' plastic kaolin, about 20% of hydrated alumina and about 8% of an alkaline earth metal compound.

13. The raw batch of a ceramic material comprising a clay mixture containing Edgars' plastic clay, ball clay and china clay, the clay content, when heated by itself, maturing at the temperature at which the ceramic body matures, and a combined synthetic sillimanite and flux formed of about 70% of Edgars' plastic kaolin, about 20% of hydrated alumina and about 8% of an alkaline earth metal compound.

14. The raw batch of a ceramic material comprising a combined synthetic sillimanite and flux, a raw clay mixture and feldspar, the combined synthetic sillimanite and flux being formed of about 70% of Edgars' plastic kaolin, about 20% of alumina and about 8% of an alkaline earth metal compound, and the clay content, when heated by itself, maturing at the temperature at which the ceramic body matures.

15. The raw batch of a ceramic material comprising about 20% of Edgars' plastic kaolin, about 10% of ball clay, about 10% of china clay and about 60% of a combined synthetic sillimanite and flux containing about 70% of Edgars' plastic kaolin, about 20% of hydrated alumina and about 8% of talc.

16. The raw batch of a ceramic material consisting of about 19% of Edgars' plastic kaolin, about 10% of ball clay, about 10% of china clay, about 3% of feldspar, and about 58% of a combined synthetic sillimanite and flux containing about 70% of Edgars' plastic kaolin, about 20% of hydrated alumina and about 8% of talc.

17. A raw batch for a ceramic body comprising ceramic materials and a clay mixture that when heated by itself matures at the temperature at which the ceramic body matures.

18. A raw batch for a ceramic body comprising aluminous materials, a flux, and a clay mixture that when heated by itself matures at the temperature at which the ceramic body matures.

19. A ceramic material consisting of 60% to 85% of sillimanite and the balance of glassy matrix formed of an alkaline earth metal compound and an alkali metal compound and dissolved silica.

20. A ceramic material formed from sillimanite, clay and a flux, and consisting of sillimanite and a glassy matrix, the silica derived from the clay upon the formation of sillimanite from the clay not exceeding 17% of the content of the material.

21. A ceramic material formed from clay and other materials, and consisting of sillimanite and a glassy matrix, the silica derived from the clay upon the formation of sillimanite from the clay not exceeding 17% of the content of the material.

22. The process of forming a ceramic body which consists in forming a raw batch of aluminous materials, flux and a clay mixture that when heated by itself will mature at the temperature at which the ceramic body matures, heating the raw batch to maturity of the clay mixture.

23. The process of forming a ceramic body which consists in forming a raw batch of aluminous materials, flux and a clay mixture that when heated by itself will mature at the temperature at which the ceramic body matures, heating the raw batch to maturity of the clay mixture to form sillimanite from the clay and a glassy matrix that will dissolve substantially all the silica that splits from the clay in the formation of sillimanite from the clay.

In testimony whereof I have hereunto signed my name to this specification.

JOSEPH A. JEFFERY.